United States Patent Office 3,681,022
Patented Aug. 1, 1972

3,681,022
MANUFACTURE OF STABLE HYDROGEN PEROXIDE SOLUTIONS
William H. Kibbel, Jr., Pennington, and Eugene T. O'Neill, Hightstown, N.J., assignors to FMC Corporation, New York, N.Y.
No Drawing. Filed May 1, 1970, Ser. No. 33,928
Int. Cl. C01b 15/02
U.S. Cl. 23—207.5       3 Claims

ABSTRACT OF THE DISCLOSURE

Very stable hydrogen peroxide solutions are made by adding an alkaline sodium stannate solution, adjusted to pH 10.5 to 11.0, with nitrilo trimethylene phosphonic acid, either adding it to concentrated hydrogen peroxide or feeding the two materials simultaneously into a mixer, and then adjusting the pH of the hydrogen peroxide to 2.75 to 3.25 for 35% peroxide solutions, and to corresponding lower or higher pH for more or less concentrated solutions, with additional nitrilo trimethylene phosphonic acid. Inorganic phosphate may be present if desired.

BACKGROUND OF THE INVENTION

The stabilization of concentrated hydrogen peroxide so that it can be diluted with water containing ions which ordinarily catalyze hydrogen peroxide decomposition has been the subject of much study. Many years ago, the utility of small amounts of tin, generally added as sodium stannate, was recognized by the art (Reichert U.S. Pat. 1,958,204). More recently, combinations of tin with other additives have been suggested. Young, in U.S. Pat. 3,333,925 issued Aug. 1, 1967, suggests tin with inorganic phosphates; Reilly et al., in U.S. Pat. 3,387,939 issued June 11, 1968, suggest the use of alkylidene diphosphonic acids, with tin; and Carnine and Darbee, coworkers in the same laboratory with the inventors herein, in U.S. Pat. 3,383,174 issued May 14, 1968, have suggested the joint use of tin with organic phosphate added as nitrilo trimethylene phosphonic acid.

The techniques using organic phosphates give products with stabilities substantially improved over peroxide stabilized with tin alone, or tin with inorganic phosphates. For example, the compositions of U.S. Pat. 3,383,174 lose only 4 to 5% of their active oxygen when stored in the open at 100° C. for 24 hours, even when contaminated with some ferric iron and a trace of copper. However, as the amounts of contaminant increase, losses become greater. Hence, there still remains room for improving stability.

OBJECT OF THE INVENTION

This invention has for its principal object the production of aqueous hydrogen peroxides of greater stability than those previously available.

STATEMENT OF THE INVENTION

We have made the surprising discovery that hydrogen peroxide solutions stabilized with sodium stannate and nitrilo trimethylene phosphonic acid can be increased in stability so that they lose active oxygen at a rate less than half that of solutions previously available under comparable conditions, simply by changing the method of combining the ingredients.

According to our invention, we prepare a dilute aqueous stannate solution containing about 0.5 to 3.0% tin, and preferably about 1.5% ±0.25% tin, in the form of a soluble alkali metal salt. The pH of the solution is then adjusted to about 10.75±0.25 with nitrilo trimethylene phosphonic acid. This solution is added to concentrated hydrogen peroxide with or without some source of inorganic phosphate such as sodium pyrophosphate, or the liquids are fed simultaneously into a mixer so that the pH of the peroxide is at a safe level, below about 5.5, at all times, to produce a diluted peroxide which is then adjusted to approximately the normal pH of unstabilized hydrogen peroxide at its concentration, using nitrilo trimethylene phosphonic acid for the adjustment. The amounts of the stabilizing ingredients vary in accordance with the concentration of hydrogen peroxide. Thus, at the typical 35% concentration, which is a common commercial grade, tin will be present at a level of about 300±25 parts per million (p.p.m.) and organic phosphate at a level of about 1250±50 p.p.m. measured as $PO_4$; pH will be about 3.0±0.25, and inorganic phosphate may be present as desired, up to about 1000 p.p.m., without injury to the system.

DETAILED DESCRIPTION OF THE INVENTION

The hydrogen peroxide to be stabilized can be that manufactured by any means, for example electrolytically, by an organic process such as the alternate oxidation and reduction of anthraquinones, oxidation of isopropyl alcohol, hydrolysis of peracetic acid or the like. Hydrogen peroxide prepared by these methods can be concentrated readily, for example by distillation methods such as those of U.S. Pats. 2,684,889 to Crewson et al. issued July 27, 1954, and 3,152,052 to T. M. Jenney et al. issued Oct. 6, 1964, by freezing rectification as described in U.S. Pat. 2,724,640 to Crewson et al. issued Nov. 22, 1955, or by other known methods.

As manufactured, the hydrogen peroxide is extremely stable; manufacturers normally employ deionized or distilled water in preparing the product so that it initially contains very little in the way of impurities. Waters employed for diluting the hydrogen peroxide, on the other hand, contain cations and other impurities indigenous to the region where the waters are obtained. Furthermore, even where the hydrogen peroxide is not to be diluted, impurities often find their way into it during its storage or use, and the stabilizers of this invention are very effective in combatting such impurities in aqueous hydrogen peroxide solutions of any concentration.

The hydrogen peroxide solutions as manufactured are acid; the pH varies in accordance with its concentration. Ninety percent hydrogen peroxide has a pH of about 0.75±0.25; at 70% concentration, the pH rises to about 1.80±0.20; the pH of 35% hydrogen peroxide, a common article of commerce, is about 3.75±0.25; more dilute hydrogen peroxides have pH up to about 5.0±0.5 for a 6% solution. These pH levels are the normal levels for the respective concentrations of hydrogen peroxide in aqueous solution. The preferred concentrations of ingredients are hereinafter given for a 35% solution, and will be greater or smaller as the hydrogen peroxide concentration of the solution is varied.

We use the basic stabilizer combination suggested in U.S. Pat. 3,383,174, tin with nitrilo trimethylene phosphonic acid, but we reduce the rate of decomposition for comparable decomposition catalytic impurities to half that obtained by following the practice of that invention, simply by the manner in which we prepare our stabilized solutions.

In the first step of the process, an aqueous stannate solution—preferably sodium or potassium stannate—is prepared, at a concentration of about 0.5±3.0% tin content, most preferably about 1.5±0.25%. The solution is then adjusted to a pH of about 10.75±0.25, solely by the addition of nitrilo trimethylene phosphonic acid.

This solution is then added to concentrated hydrogen peroxide, or added to a mixer simultaneously therewith, to produce a diluted stabilized peroxide solution. In making 35% or 50% hydrogen peroxide, the original concentrated peroxide is conveniently 70% peroxide; in making 70% peroxide, the original concentration is higher, 65+% can be made from 70% if the tin solution is 1.5% Sn. Solubility is not limiting, the formation of a proper "sol" dictates the desirable 1.5% Sn concentration.

In any case, the pH of the final hydrogen peroxide solution should be adjusted close to that of normal hydrogen peroxide of that concentration without stabilizer. As indicated above, this is about 3.0±0.25 for this 35% hydrogen peroxide; the adjustment is done solely with nitrilo trimethylene phosphonic acid.

Inorganic phosphates can be used if desired. When used, they are incorporated into the peroxide solution before the tin-phosphonic acid solution is added. Desirably, material of a kind and quality so as to maintain the peroxide solution on the acid side is used. The pH of the hydrogen peroxide should not go above a safe value of about 5.5. More phosphonic acid is needed when sodium pyrophosphate is used, simply for pH control.

As indicated in U.S. Pat. 3,383,174, the solution may also contain small amounts of sodium nitrate.

A typical 35% hydrogen peroxide prepared in accordance with this invention will contain, in addition to 35.0 to 36.0% hydrogen peroxide and water, about 300±25 p.p.m. of tin, about 1250±50 p.p.m. of organic phosphorus, measured as $PO_4$, and may contain from 0 to as much as 1000 p.p.m. of inorganic phosphorus, as $PO_4$. In addition, a typical peroxide will contain about 150 to 250 p.p.m. of $NO_3$.

Solutions made in accordance with this invention have stabilities ranging from about 98.5 to 99.8%. This means that only 1.5 to 0.2% of the hydrogen peroxide is decomposed after 24 hours' retention at 100° C., using the following test method:

Fifty-milliliter volumetric flasks are immersed for a minimum of 1 hour in 10% NaOH, and rinsed thoroughly with distilled or deionized water. They are then immersed for at least 3 hours in 10% $HNO_2$, again thoroughly rinsed, loosely covered with aluminum foil, and dried in an oven at 100° C. Fifty milliliters of hydrogen peroxide of known strength are placed in the flask, which is placed, unstoppered but covered to protect against dust, in a water bath at 100° C. for 24 hours; the water level should not be above the 50 ml. mark on the flask, and the bottom of the flask should not rest on the bottom of the water bath. After 24 hours, the flask is removed from the bath and cooled, volume readjusted to exactly 50 ml. with distilled or deionized water, and analyzed for hydrogen peroxide to determine percent remaining, which is reported as stability.

This improvement carries over into solutions into which contaminants are purposely added.

Using the method shown in U.S. Pat. 3,383,174, and available peroxide reduced to 35% concentration by the method of that patent, the addition of 5 mg./l. of $Fe^{+++}$ +0.05 mg./l. of $Cu^{++}$ gave a stability of 91.7%; when the present method was used, the stability was 98.2%. At a contaminant level of 5 mg./l. of $Fe^{+++}$ and 0.15 mg./l. of $Cu^{++}$, the stability of 35% peroxide produced by the method of that patent was 81.8%, whereas that produced by the present method was 97.7%.

A second method used in the industry is to prepare a solution containing 0.25 mg./l. $Al^{+++}$, 0.25 mg./l. $Fe^{+++}$, 0.05 mg./l. $Cu^{++}$, 0.025 mg./l. $Mn^{++}$, and 0.012 mg./l. $Cr^{++++++}$, as follows: Solutions of $CuSo_4$ (Cu= 200 mg./l.) $MnSO_4$ (Mn=100 mg./l.) $K_2CrO_4$ (Cr=50 mg./l.) are prepared individually; $FeNH_4(SO_4)_2$ and $AlK(SO_4)_2$, to yield 100 mg./l. Fe and 100 mg./Al., are dissolved in 200 to 300 ml. of distilled water, 100 ml. each of the copper, manganese and chromium solutions are added, together with 1 to 2 ml. of $H_2SO_4$, to the iron/aluminum solution and the solution is diluted to 1 liter. In testing, 2.5 ml. of the solution is used per liter of hydrogen peroxide solution being tested: Stability is determined by the same technique described above, heating at 100° C. for 24 hours. This test is designed to test the stability of hydrogen peroxide when diluted with untreated water at the point of use, and is hereinafter called the catalytic decomposition test. Peroxide stabilized by the method of U.S. Pat. 3,383,174, when diluted to 6% concentration, showed a stability of 74.9% after 16 hours by this test; when stabilized with the same stabilizers by the method of this invention, it showed a stability of 98.5%.

SPECIFIC EXAMPLES OF THE INVENTION

The following specific examples of this invention are given by way of illustration, and not by way of limitation.

Example I

In 1000 grams of deionized water in a passivated Pyrex beaker, 33.7 grams of sodium stannate trihydrate were dissolved with vigorous stirring to yield a 1.5% tin (Sn) solution. The solution was adjusted to pH 10.75 with nitrilo trimethylene phosphonic acid. The pH measurements were made with a glass electrode.

In 960 grams of 73% unstabilized hydrogen peroxide, 2.24 grams of tetrasodium pyrophosphate were dissolved with vigorous stirring, to provide 1600 p.p.m. of $PO_4$ 70% $H_2O_2$ basis. Enough of the sodium stannate solution was added to provide 1350 p.p.m. of sodium stannate trihydrate 70% $H_2O_2$ basis. The hydrogen peroxide solution was then adjusted to pH 1.3 with nitrilo trimethylene phosphonic acid. After pH adjustment, 548 p.p.m. of sodium nitrate were added on a 70% $H_2O_2$ basis. The fully stabilized hydrogen peroxide at 70% concentration was diluted with deionized water to provide 35% and 6% portions.

The 35% solution was tested using the contamination method of U.S. Pat. 3,383,174.

Percent stability at contaminant levels

No contaminant _____ 99.3
5 mg./l. $Fe^{+++}$+0.05 mg./l. $Cu^{++}$ _____ 98.2
5 mg./l. $Fe^{+++}$+0.15 mg./l. $Cu^{++}$ _____ 97.7

The 6% solution was adjusted to pH 3.5–4.0 with 10% phosphoric acid and tested by means of the catalytic decomposition test.

6% $H_2O_2$—percent stability—24 hours/100° C.

No contaminant _____ 99.6 (avg. of 2)
With contaminant _____ 98.8 (avg. of 3)

EXAMPLE II

Same as Example I except that no tetrasodium pyrophosphate and no sodium nitrate was added to the hydrogen peroxide solution. As before, the 35% solution pH was between 2.75 and 3.25. The 6% solution was adjusted from pH 4.5–5.0 to pH 3.5–4.0 with 10% phosphoric acid. The stabilities of the solutions were determined by the conventional 24-hour 100° C. hot-stability test. In addition, the 6% solution was tested by the catalytic decomposition test.

Percent stability—24 hours/100° C.

35% $H_2O_2$ _____ 99.1 (avg. of 2)
6% $H_2O_2$ _____ 99.5
6% $H_2O_2$+catalyst _____98.9 (avg. of 4)

Example III

Same as Example I except that no sodium nitrate was added to the hydrogen peroxide solution. Stabilities of the solutions were determined as in Example II.

Percent stability—24 hours/100° C.

| | |
|---|---|
| 35% $H_2O_2$ | 99.0 (avg. of 2) |
| 6% $H_2O_2$ | 98.4 (avg. of 2) |
| 6% $H_2O_2$+catalyst | 98.3 (avg. of 4) |

Obviously, the examples can be multiplied indefinitely without departing from the invention as defined in the claims.

We claim:

1. A method of stabilizing hydrogen peroxide, which comprises preparing an aqueous alkali metal stannate solution containing 0.5 to 3% of tin, reducing the pH solely with nitrilo trimethylene phosphonic acid to 10.75 ±0.25, mixing this solution with a hydrogen peroxide solution under conditions which keep the pH of the hydrogen peroxide below 5.5 at all times, to give a tin concentration of 275 to 325 p.p.m. based on 35 wt. percent hydrogen peroxide, and then adjusting the pH of the hydrogen peroxide close to the normal level for its concentration solely with nitrilo trimethylene phosphonic acid, said normal pH being 3.0±0.25 for 35% hydrogen peroxide.

2. The method of claim 1, in which the tin is added as a sodium stannate solution containing 1.5% of tin.

3. The method of claim 1, in which the phosphate level derived from nitrilo trimethylene phosphonic acid is about 1250±50 p.p.m. measured as $PO_4$, based on 35 wt. percent hydrogen peroxide.

References Cited

UNITED STATES PATENTS

| | | | |
|---|---|---|---|
| 3,383,174 | 5/1968 | Carnine et al. | 23—207.5 |
| 3,387,939 | 6/1968 | Reilly et al. | 23—207.5 |

OSCAR R. VERTIZ, Primary Examiner

H. S. MILLER, Assistant Examiner